US007715488B2

(12) United States Patent
Pedersen et al.

(10) Patent No.: US 7,715,488 B2
(45) Date of Patent: May 11, 2010

(54) APPARATUS, METHOD AND COMPUTER PROGRAM PRODUCT PROVIDING CLOSED LOOP TRANSMIT ANTENNA OPERATION FOR SYSTEMS USING MULTIPLE ANTENNAS

(75) Inventors: Klaus Pedersen, Aalborg (DK); Preben Mogensen, Gistrup (DK)

(73) Assignee: Nokia Corporation, Espoo (FI)

( * ) Notice: Subject to any disclaimer, the term of this patent is extended or adjusted under 35 U.S.C. 154(b) by 905 days.

(21) Appl. No.: 11/479,842

(22) Filed: Jun. 30, 2006

(65) Prior Publication Data

US 2007/0002963 A1    Jan. 4, 2007

Related U.S. Application Data

(60) Provisional application No. 60/696,357, filed on Jun. 30, 2005.

(51) Int. Cl.
*H04B 7/02* (2006.01)
(52) U.S. Cl. ...................................... 375/267
(58) Field of Classification Search .................. 375/267
See application file for complete search history.

(56) References Cited

U.S. PATENT DOCUMENTS

| 6,888,809 | B1 | 5/2005 | Foschini et al. | 370/334 |
|---|---|---|---|---|
| 6,927,728 | B2 * | 8/2005 | Vook et al. | 342/377 |
| 7,116,944 | B2 | 10/2006 | Das et al. | 455/69 |
| 2003/0148738 | A1 | 8/2003 | Das et al. | 455/67.5 |
| 2005/0037718 | A1 | 2/2005 | Kim et al. | 455/101 |
| 2005/0141631 | A1 * | 6/2005 | Takano | 375/267 |
| 2005/0181736 | A1 * | 8/2005 | Cao et al. | 455/69 |

(Continued)

FOREIGN PATENT DOCUMENTS

KR    2001-76252    8/2001

(Continued)

OTHER PUBLICATIONS

Universal Mobile Telecommunications System (UMTS); Physical Layer Procedures (FDD) (3GPP TS 25.214 version 5.0.0 Release 5), ETSI TS 125 214 V5.0.0 (Mar. 2002), Technical Specification.

(Continued)

*Primary Examiner*—Don N Vo
(74) *Attorney, Agent, or Firm*—Harrington & Smith (57) ABSTRACT

A method includes determining weights corresponding to each of a plurality of antennas used to transmit data signals, each weight suitable to modify a corresponding one of the data signals prior to transmission using a corresponding one of the antennas; and transmitting information corresponding to at least one of the weights, the information allowing at least the at least one weight to be determined. Another method includes receiving information corresponding to at least one of a plurality of weights, the plurality of weights corresponding to a plurality of first antennas used to transmit first data signals, where each weight was used to modify a corresponding one of the first data signals prior to transmission using a corresponding one of the first antennas; using the received information, determining the plurality of weights corresponding to the plurality of first antennas; and using at least the plurality of weights; and decoding second data signals received using a plurality of second antennas to create at least one output signal.

37 Claims, 5 Drawing Sheets

U.S. PATENT DOCUMENTS

2005/0243942 A1* 11/2005 Sawai .......................... 375/267
2006/0074612 A1* 4/2006 Kent et al. ..................... 703/2
2006/0274844 A1* 12/2006 Walton et al. ............... 375/260

FOREIGN PATENT DOCUMENTS

WO    WO02-41524 A1    5/2002

WO    WO 02/093784 A1    11/2002

OTHER PUBLICATIONS

"3$^{rd}$ Generation Partnership Project; Technical Specification Group Radio Access Network; Physical Layer—Measurements (FDD) (Release 6)" 3 GPP TS 25.215 V6.3.0 (Jun. 2005).

* cited by examiner

APPARATUS, METHOD AND COMPUTER PROGRAM PRODUCT PROVIDING CLOSED LOOP TRANSMIT ANTENNA OPERATION FOR SYSTEMS USING MULTIPLE ANTENNAS

CROSS-REFERENCE TO RELATED APPLICATIONS

The present application claims the benefit under 35 U.S.C. §119(a) of provisional patent application No. 60/696,357, filed on Jun. 30, 2005.

TECHNICAL FIELD

The examples of this invention relate generally to digital cellular communications systems, methods, terminals and computer programs and, more specifically, relate to techniques for providing antenna-related feedback information between user equipment and a base station.

BACKGROUND

The following abbreviations, at least some of which appear in the description below, are defined as follows:

| | |
|---|---|
| 3GPP | Third Generation Partnership Project |
| BS | Base Station |
| BTS | Base Transceiver Station |
| CLM | Closed loop transmit diversity mode |
| CSI | Channel state information (the equivalent to CQI in EUTRAN) |
| CQI | Channel quality information |
| DL | Downlink |
| DPCH | Dedicated Physical Channel |
| EUTRAN | Evolved UTRAN |
| FBI | Feedback Information |
| F-DPCH | Fractional Dedicated Physical Channel |
| HSDPA | High Speed Downlink Packet Access |
| HS DPCCH | High Speed Dedicated Physical Control Channel |
| HS DSCH | High Speed Downlink Shared Channel |
| HS SCCH | High Speed Shared Control Channel |
| MIMO | Multiple Input, Multiple Output |
| Node B | Base station |
| OFDM | Orthogonal Frequency Division Duplex |
| SRB | Signaling Radio Bearer |
| UE | User Equipment |
| UL | Uplink |
| UMTS | Universal Mobile Telecommunications System C304 |
| UTRA FDD | UMTS Terrestrial Radio Access-Frequency Division Duplex |
| UTRAN | UMTS Terrestrial Radio Access Network |
| WCDMA | Wideband Code Division Multiple Access |

The DL packet data transmission in UTRA FDD (WCDMA) is a feature included in Release 5 specifications (HSDPA) and is further enhanced in Release 6 with the support of fractional DPCH (F DPCH), and with the support of SRB mapping on the HS DSCH.

Currently there is development work proceeding for Release 7. One HSDPA feature that is of most concern to this invention is relates to the transmit and receive sub-systems of the Node-B and the UE.

BRIEF SUMMARY

In an exemplary embodiment, a method is disclosed that determines weights corresponding to each of a plurality of antennas used to transmit data signals. Each weight is suitable to modify a corresponding one of the data signals prior to transmission using a corresponding one of the antennas. The method also includes transmitting information corresponding to at least one of the weights, the information allowing at least the at least one weight to be determined.

In another exemplary embodiment, an apparatus includes a transceiver configured to be coupled to a plurality of antennas used to transmit data signals. The apparatus also includes one or more memories comprising program code, and one or more data processors coupled to the one or more memories and to the transceiver. The one or more data processors are configured when the program code is executed to perform the following operations: determining weights corresponding to each of the plurality of antennas, each weight suitable to modify a corresponding one of the data signals prior to transmission using a corresponding one of the antennas; and causing the transceiver to transmit information corresponding to at least one of the weights, the information allowing at least the at least one weight to be determined.

In an additional exemplary embodiment, a signal bearing medium is disclosed that tangibly embodies a program of machine-readable instructions executable by at least one data processor to perform operations. The operations include determining weights corresponding to each of a plurality of antennas used to transmit data signals, where each weight is suitable to modify a corresponding one of the data signals prior to transmission using a corresponding one of the antennas. The operations also include causing information to be transmitted corresponding to at least one of the weights, the information allowing at least the at least one weight to be determined.

In yet another exemplary embodiment, a method is disclosed that includes receiving information corresponding to at least one of a plurality of weights, the plurality of weights corresponding to a plurality of first antennas used to transmit first data signals. Each weight was used to modify a corresponding one of the first data signals prior to transmission using a corresponding one of the first antennas. The method also includes, using the received information, determining the plurality of weights corresponding to the plurality of first antennas; and using at least the plurality of weights, decoding second data signals received using a plurality of second antennas to create at least one output signal.

In a further exemplary embodiment, an apparatus is disclosed that includes a transceiver configured to be coupled to a plurality of first antennas used to receive first data signals. The transceiver is configured to receive information corresponding to at least one of a plurality of weights, the plurality of weights corresponding to a plurality of second antennas used to transmit second data signals. Each weight was used to modify a corresponding one of the second data signals prior to transmission using a corresponding one of the second antennas. The apparatus also includes one or more memories comprising program code, and one or more data processors coupled to the one or more memories and to the transceiver. The one or more data processors are configured when the program code is executed to perform the operation of determining, using the received information, the plurality of weights corresponding to the plurality of second antennas. The operations further include, using at least the plurality of weights, decoding the first data signals to create at least one output signal.

In an additional exemplary embodiment, a signal bearing medium tangibly embodies a program of machine-readable instructions executable by at least one data processor to perform operations including causing information to be received. The information corresponds to at least one of a plurality of weights, and the plurality of weights correspond to a plurality of first antennas used to transmit first data signals, where each weight was used to modify a corresponding one of the first data signals prior to transmission using a corresponding one of the first antennas. The operations also include, using the received information, determining the plurality of weights corresponding to the plurality of first antennas, and additionally include, using at least the plurality of weights, decoding second data signals received using a plurality of second antennas to create at least one output signal.

BRIEF DESCRIPTION OF THE DRAWINGS

The foregoing and other aspects of embodiments of this invention are made more evident in the following Detailed Description of Exemplary Embodiments, when read in conjunction with the attached Drawing Figures, wherein.

DETAILED DESCRIPTION OF EXEMPLARY EMBODIMENTS

By way of introduction, it can be shown that a desirable HSDPA transmission scheme would be based on a closed loop antenna transmit technique with two transmit (Tx) and two receive (Rx) antennas (e.g., if used for HSDPA under realistic operating conditions in combination with fast packet scheduling). However, there are currently problems associated with closed loop modes 1 and 2 schemes defined for HSDPA in 3GPP Release 5. A 3GPP specification of particular interest in this regard is 3GPP TS 25.214, Physical layer procedures (FDD) (Release 5). The problems are related to the resolution and update rate of the feedback from the UE, and antenna verification. The problem with antenna verification occurs because the UE does not have knowledge of the antenna weights that the Node B is using for transmission. The problem with antenna verification is compounded with the introduction of F-DPCH in HSDPA, where it has been decided that it is no longer mandatory for the UE to support neither CLM1 nor CLM2 in the case of F-DPCH. Hence, closed loop transmit diversity is generally not usable for HSDPA in 3GPP Rel'6.

As such, it can be appreciated that in order to have robust and attractive usage of a 2 Tx closed loop antenna scheme for HSDPA evolution a new approach is required.

The exemplary embodiments of this invention provide an enhancement to the closed loop transmit diversity scheme that is currently specified for HSDPA in 3GPP Releases 5 and 6. However, and while the exemplary embodiments of this invention are described in the context of HSDPA, it should be kept in mind that these teachings are applicable to other types of wireless communications systems including, but not limited to EUTRAN.

Figure 1:
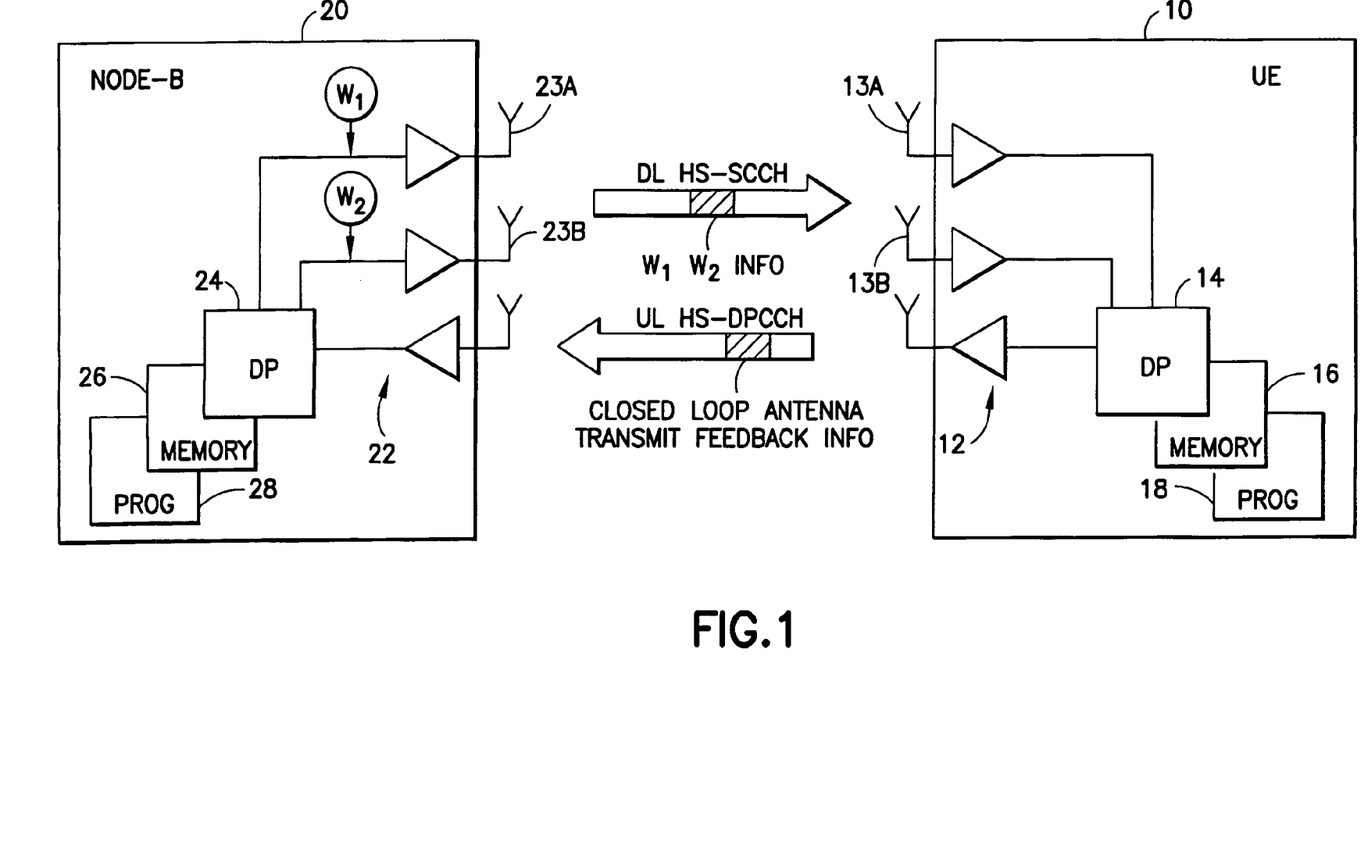
FIG. 1 is a simplified block diagram showing exemplary major elements used to implement an exemplary embodiment of this invention.

FIG. 1 is a simplified block diagram showing the major elements used to implement this invention, specifically a HSDPA terminal 10, also referred to as User Equipment (UE) 10, and a BS, also referred to as a Node-B 20. As used herein, but not as a limitation on the practice of this invention, the Node-B may be assumed to be functionally equivalent to a 3GPP 25-series specification term Node-B.

FIG. 1 shows that the HSDPA terminal 10 includes a suitable wireless transceiver 12 having first and second receive antennas 13A, 13B. The transceiver 12 is coupled to at least one data processor (DP) 14 that in turn includes or is coupled to a volatile and/or non-volatile memory 16. The memory 16 stores program code 18 that is executable by the DP 14 to operate with a Node-B 20, including program code that is provided to implement the UE 10 aspects of this invention. The Node-B 20 is constructed to include a transceiver 22 having first and second transmit antennas 23A, 23B. Associated with antennas 23A, 23B are assumed to be corresponding antenna weights (W1, W2). The Node-B 20 is also assumed to include at least one DP 24 that in turn includes or is coupled to a volatile and/or non-volatile memory 26. The memory 26 stores program code 28 that is executable by the DP 24 to operate with the UE 10, including program code that is provided to implement the Node-B 20 aspects of this invention.

Note that while FIG. 1 shows the use of separate transmit and receive antennas at the UE 10 and at the Node-B 20, in practice the same antenna(s) may used for both transmission and reception.

The memories 16 and 26 may be of any type suitable to the local technical environment and may be implemented using any suitable data storage technology, such as semiconductor based memory devices, magnetic memory devices and systems, optical memory devices and systems, fixed memory and removable memory. The data processors 14 and 24 may be of any type suitable to the local technical environment, and may include one or more of general purpose computers, special purpose computers, microprocessors, digital signal processors (DSPs) and processors based on a multi core processor architecture, as non limiting examples.

In general, the various embodiments of the UE 10 can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

In accordance with the teachings of this invention there is an enhancement to the HSDPA to allow the UE 10 to send closed loop antenna transmit feedback information to the Node B 20, where the UE 10 sends the closed loop antenna transmit feedback information on the UL HS DPCCH, rather than sending FBI information on the DPCCH. This approach beneficially enables the use of more bits for sending feedback information to the Node B 20. Further, the feedback rate may be made dynamic (e.g., corresponding to the CQI feed back rate).

The feedback information may comprise information for specifying UE-recommended antenna weights to be used by the Node B 20 (e.g., BS or BTS), where an antenna weight may be expressed in terms of amplitude and phase. For instance, antenna weights are typically complex numbers of the type $W_i=a_i+jb_i$ and the amplitude and phase can be determined using the weight.

Further in accordance with exemplary embodiments of this invention, the transmission format for the DL HS SCCH is modified such that the HS SCCH also contains information on the applied transmit antenna scheme used at the Node B 20, including antenna weight (W1, W2) information. Sending this information on the HS SCCH to the UE 10 reduces or eliminates the problems referred to above regarding antenna verification (e.g., 3GPP Release '5).

The closed loop transmit antenna feedback scheme in accordance with the exemplary embodiments of this invention supports antenna transmit diversity weights, and also MIMO multi stream closed loop feedback information. This is described in more detail in reference to FIGS. 2 and 3.

Figure 2:
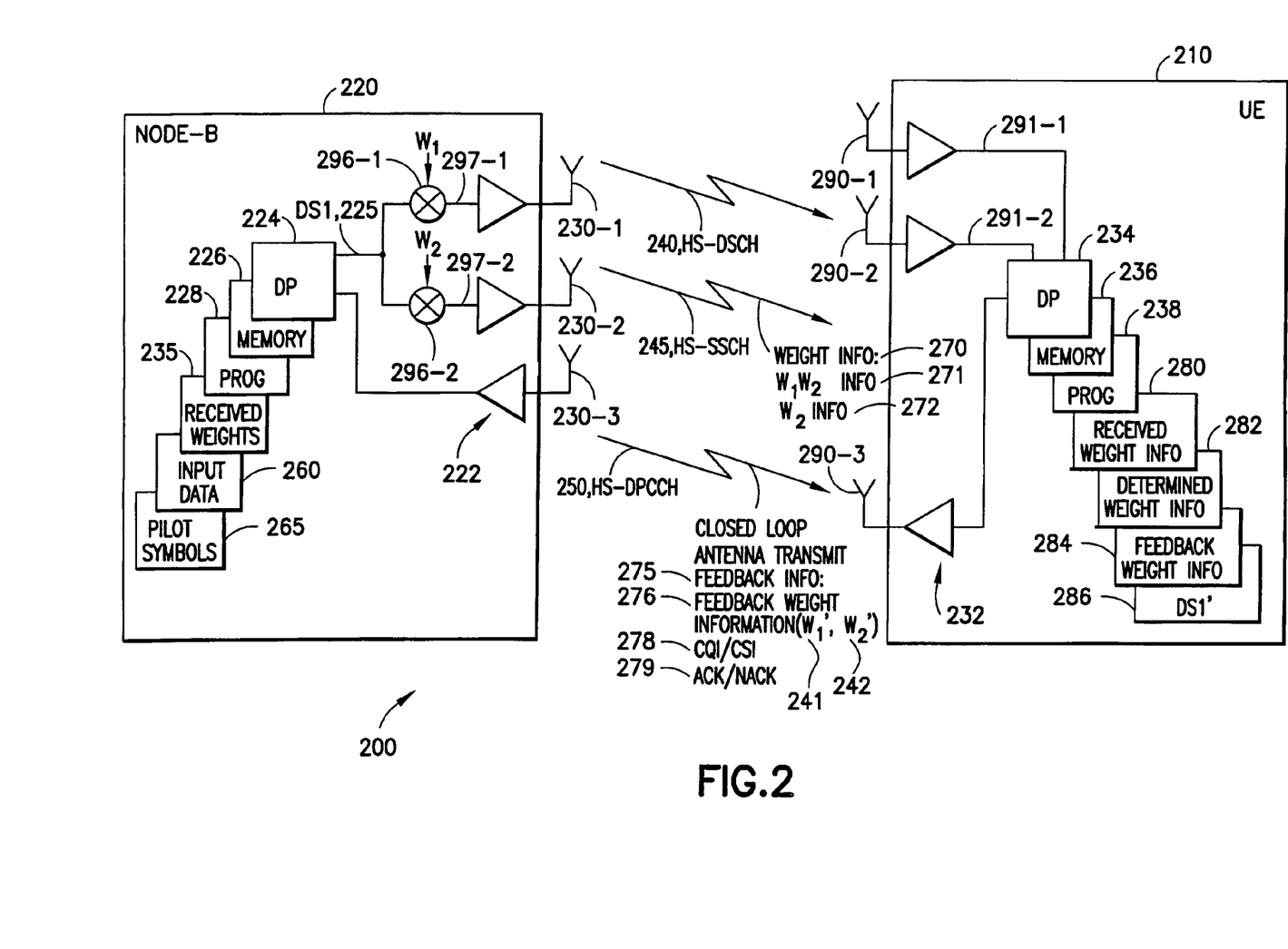
FIG. 2 is another simplified block diagram showing exemplary elements used to implement an exemplary embodiment of this invention using diversity transmission and reception.

Turning to FIG. 2, a simplified block diagram is shown illustrating exemplary elements used to implement an exemplary embodiment of this invention using diversity transmission and reception. Wireless communication system 200 comprises a Node B 220 and a UE 210 communicating using the communication channels HS DSCH 240, the HS SSCH 245 and HS DPCCH 250. The Node B 220 comprises a DP 224, a memory 226, multipliers 296-1 and 296-2, and a transceiver 222. The memory 226 comprises program code 228, received weights 235, input data 260, and pilot symbols 265. The Node B 220 is coupled to or comprises antennas 230-1, 230-2, and 230-3. The UE 210 comprises a DP 234, a memory 236, and a transceiver 232. The UE 210 is coupled to or comprises antennas 290-1, 290-2, and 290-3. The memory 236 includes program code 238, received weight information 280, determined weight information 282, feedback weight information 284, and output data DS1' 286 corresponding to the data in data signal DS1 225.

Node B 220 communicates input data 260 by performing such functions as modulation, spreading, scrambling (e.g., encryption), and frequency shifting (e.g., from baseband to transmission band) to create data signal DS1 225. In this example, the data signal DS1 225 is coupled to both multipliers 296-1 and 296-2 and modified (e.g., multiplied) by a corresponding antenna weight $W_1$, $W_2$, respectively, to create modified data signals 297-1, 297-2 and communicated using antennas 230-1, 230-2, respectively. Periodically, the DP 224 also causes the pilot symbols 265 to be transmitted as data signal DS1 225, although one or both antennas 230-1 and 230-2 may be used to transmit the data signal DS1 225 having the pilot symbols 265.

The data signal DS1 225 is transmitted using HS DSCH 240 to the UE 210. Additionally, the Node B 220 transmits (e.g., under control of the program code 228 and DP 224) weight information 270 on the HS SCCH 245 to the UE 210. The weight information 270 is "feed forward" indications of the weights $W_1$, $W_2$, and the weight information 270 can include information 271 corresponding to both antenna weights (i.e., $W_1$, $W_2$) or information 272 corresponding to one of the weights (e.g., $W_1$ or $W_2$). It is noted that the weight information 270 could include, e.g., a phase difference between the antenna weights $W_1$ and $W_2$, values of $W_1$, $W_2$, or information that is mapped to give the W1 and/or $W_2$. When information 272 (e.g., corresponding to antenna weight $W_2$) is transmitted, the UE would then be able to determine information corresponding to the other antenna weight (e.g., W1) using the transmitted information 272. The UE 210 (e.g., under control of the program code 238 and the DP 234) places the weight information 270 in received weight information 280, and if necessary determines determined weight information 282 from the received weight information 280. In one embodiment, the received weight information 280 corresponds to both $W_1$ and $W_2$ and determined weight information 282 corresponds to both $W_1$ and $W_2$. In another embodiment, the received weight information 280 corresponds to $W_2$ (e.g., or $W_1$) and the UE 210 determines determined weight information 282 (e.g., corresponding to both $W_1$ and $W_2$) using the received weight information 280 of $W_2$ (e.g., or W1).

The UE 210 uses the determined weight information 282 during decoding of the received data signals 291-1 and 291-2 and determines output data (DS1') 286 corresponding to the data in data signal DS1 225. The UE 210 also uses this determined weight information 282 for channel estimation, including for estimating new antenna weights (i.e., feedback weight information 284) which are afterwards signaled back to the Node-B. The UE 210 (e.g., again under control of the program code 238 and the DP 234) therefore determines feedback weight information 284 using, e.g., the pilot symbols 265 that are transmitted on the HS DSCH 240 and corresponding channel estimation determined using the determined weight information 282. The UE 210 communicates the feedback weight information 276 (corresponding to feedback weight information 284) to the Node B as part of closed loop transmit feedback information 275 on the HS DPCCH 250. The feedback weight information 276 includes one or more of feedback weight information $W_1'$ 241 corresponding to a calculated W1 and feedback weight information $W_2'$ 242 corresponding to a calculated $W_2$. Note also that the feedback weight information 276 could include differences, such as a phase difference, between the antenna weights $W_1$ and $W_2$. The closed loop transmit feedback information 275 may also include CQI/CSI 278 and may also include Acknowledge (Ack)/No Acknowledge (Nack) from the current or previous transmissions.

The Node B 220 uses the received weight information 235, which correspond to the feedback weight information 276, to revise antenna weights $W_1$, $W_2$. Exemplary techniques for determinations of antenna weights by the UE 210 and the revision of the antenna weights by the Node B 220 are described in, e.g., 3GPP TS 25.214, V5.0.0 (2002-03) and later documents. It is noted that the system 200 of FIG. 2 uses diversity transmission because the same signal (data signal DS1 225) is transmitted using different antennas 230-1, 230-2.

Figure 3:
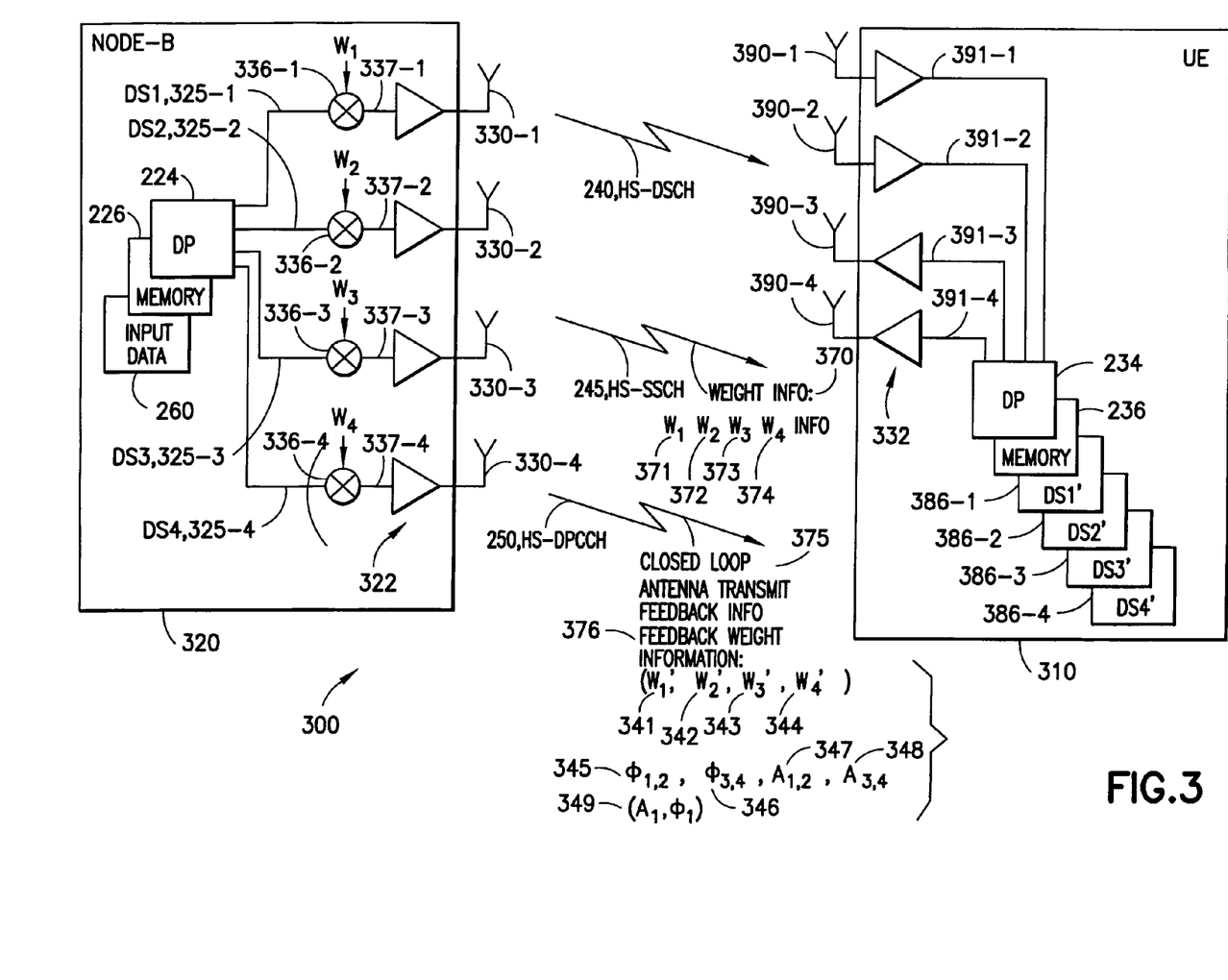
FIG. 3 is another simplified block diagram showing exemplary elements used to implement an exemplary embodiment of this invention using multiple input, multiple output (MIMO) transmission and reception.

By contrast, FIG. 3 shows another simplified block diagram showing exemplary elements used to implement multiple input, multiple output (MIMO) transmission and reception. System 300 in FIG. 3 includes many of the same elements as in FIG. 2, and therefore only differences will be described herein. The communication system 300 includes a Node B 320 including DP 224 that is coupled to multipliers 336-1 through 336-4 and through transceiver 322 to the antennas 330-1 through 330-4. The DP 224 splits the input data 260 into the data signals DS1 325-1 to DS4 325-4, each of which is modified (e.g., multiplied) using the multipliers 336 by a corresponding weight $W_1$ through $W_4$ to create a modified data signal 337-1 through 3374 that is then transmitted using the transceiver 322 and the antennas 330. The Node B 320 also communicates weight information 370, including one or more of the weight information 371 corresponding to W1, weight information 372 corresponding to $W_2$, weight information 373 corresponding to $W_3$, and weight information 374 corresponding to $W_4$ 374, to the UE 210.

The UE 210 receives the HS DSCH 240 using the antennas 390-1 through 390-4 and the transceiver 332 creates the received data signals 391-1 through 391-4. The DP 234 then creates output data DS1' 386-1, DS2' 386-2, DS3' 386-3, and DS4' 386-4, corresponding to data signals DS1 325-1, DS2 325-2, DS3 325-3, and DS4 325-4, respectively. In MIMO, N receive antennas 390 receive information from M transmit antennas 330, and there can be min(M,N) independent subchannels. In an exemplary embodiment, M is not equal to N. In the example of FIG. 3, there are four independent subchannels, although fewer subchannels could be used for this amount of transmit antennas 330. The UE 310 communicates feedback weight information 376, including one or more of feedback weight information $W_1'$ 341 corresponding to a calculated $W_1$, including feedback weight information $W_2'$ 342 corresponding to a calculated $W_2$, including feedback weight information $W_3'$ 343 corresponding to a calculated $W_3$, including feedback weight information $W_4'$ 344 corresponding to a calculated $W_4$, using the HS DPCCH 250 to the Node B 320. The feedback weight information 376 (and also "feed forward" information 270, 370) can also include phase difference 345 ($\phi_{1,2}$) between $W_1$ and $W_2$, phase difference 346 ($\phi_{3,4}$) between $W_3$ and $W_4$, amplitude difference 347 ($A_{1,2}$) between $W_1$ and $W_2$, and amplitude difference 348 ($\phi_{3,4}$) between $W_3$ and $W_4$. Furthermore, each feedback weight information 341, 342, 343, 344 can include weight information 349 ($A_1, \phi_1$) having an amplitude and a phase, in this example for $W_1$. It is also noted that such feedback weight information 376 will typically be mapped from a set of bits to an appropriate amplitude and/or phase, as described below in reference to FIG. 6.

The slot formats for the HS SCCH and HS DPCCH messaging that carries the aforementioned additional information may be arranged in any suitable manner.

Figure 4:
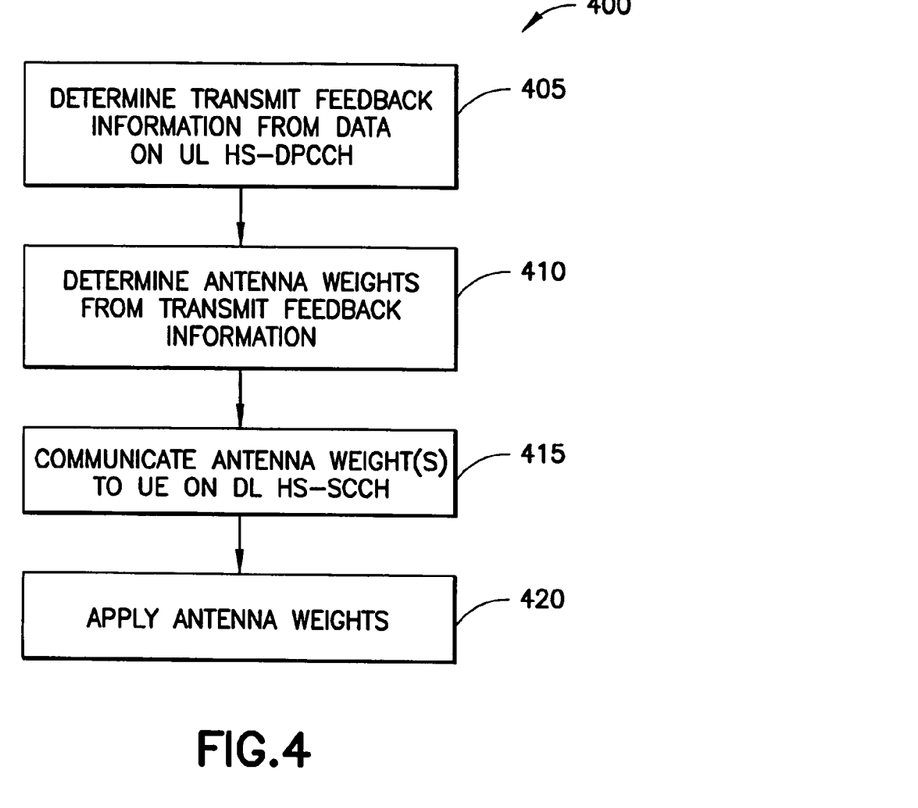
FIG. 4 is a flowchart of an exemplary method performed by a network node for providing closed loop transmit antenna operation.
Figure 6:
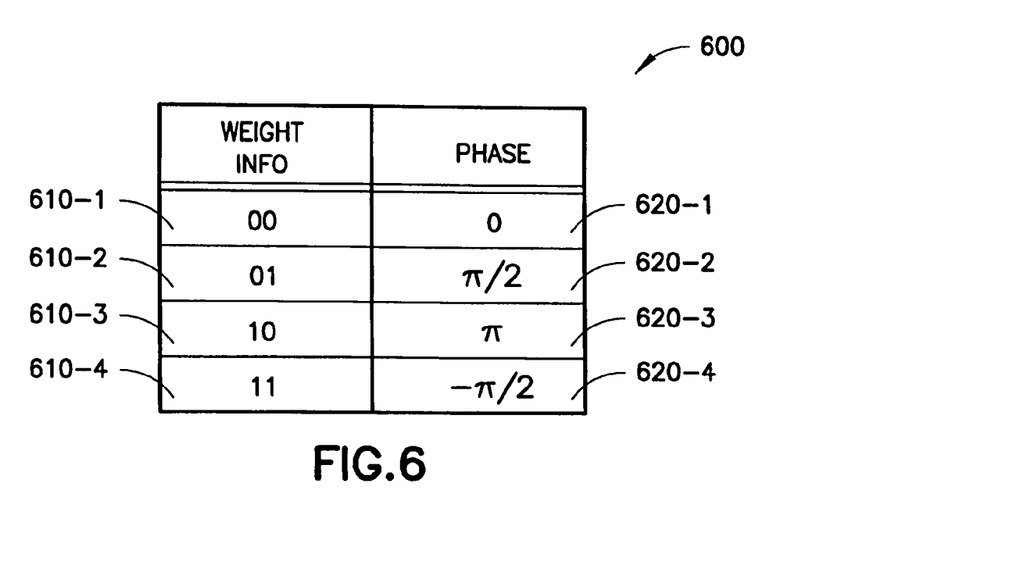
FIG. 6 is a table used to map antenna weight information to phase for a given antenna weight.

Referring to FIG. 4 with appropriate reference to preceding figures, a flowchart is shown of an exemplary method 400 performed by a network node such as the Node B 20, 220, 320 (although other network nodes are also possible) for providing closed loop transmit antenna operation. The Node B 20, 220, 320 would operate under control of the program code 28, 228 for performing method 400. Method 400 starts in block 405 when the closed loop transmit feedback information 275, 375 is determined from data on the UL HS DPCCH 250. In block 410, the antenna weights are determined using the closed loop transmit feedback information 275, 375 (e.g., feedback antenna weight information 276, 376). For instance, there might be a situation where the W1 is fixed at ($1/\sqrt{2}$) and the magnitude of the amplitude of $W_2$ is fixed but the phase is allowed to vary in the range $\{0, -\pi/2, \pi/2, \pi\}$. The feedback antenna weight information 276 would therefore include only information 242 corresponding to $W_2$, and the information 242 includes two bits, e.g., 00 (corresponding to a phase of zero), 01 (corresponding to a phase of $\pi/2$), 10 (corresponding to a phase of $\pi$), or 11 (corresponding to a phase of $-\pi/2$). This is shown in FIG. 6, wherein weight information 610-1 through 610-4 corresponds to antenna weight information 242. Each weight information 610-1 through 610-4 is mapped using the table 600 to a corresponding phase 620-1 through 620-2. The network node, Node B 220 for instance, could then set the antenna weight $W_2$ equivalent to the phase indicated by the information 242 as the amplitude is already known.

In block 415, the antenna weights are communicated to the UE 210, 310 on the DL HS SCCH 245. In this example, the network node uses two bits in the weight information 270 (including only weight information 272 corresponding to $W_2$) to indicate the phase of $W_2$. In the example of FIG. 6, one of the two-bit sequences in weight information 610-1 through 6104 is transmitted by the network node to the UE. It is noted that the table 600 could also map bits to amplitudes or amplitudes and phase, if desired. In block 420, the antenna weights are applied to the data signals 225, 235 being transmitted.

Figure 5:
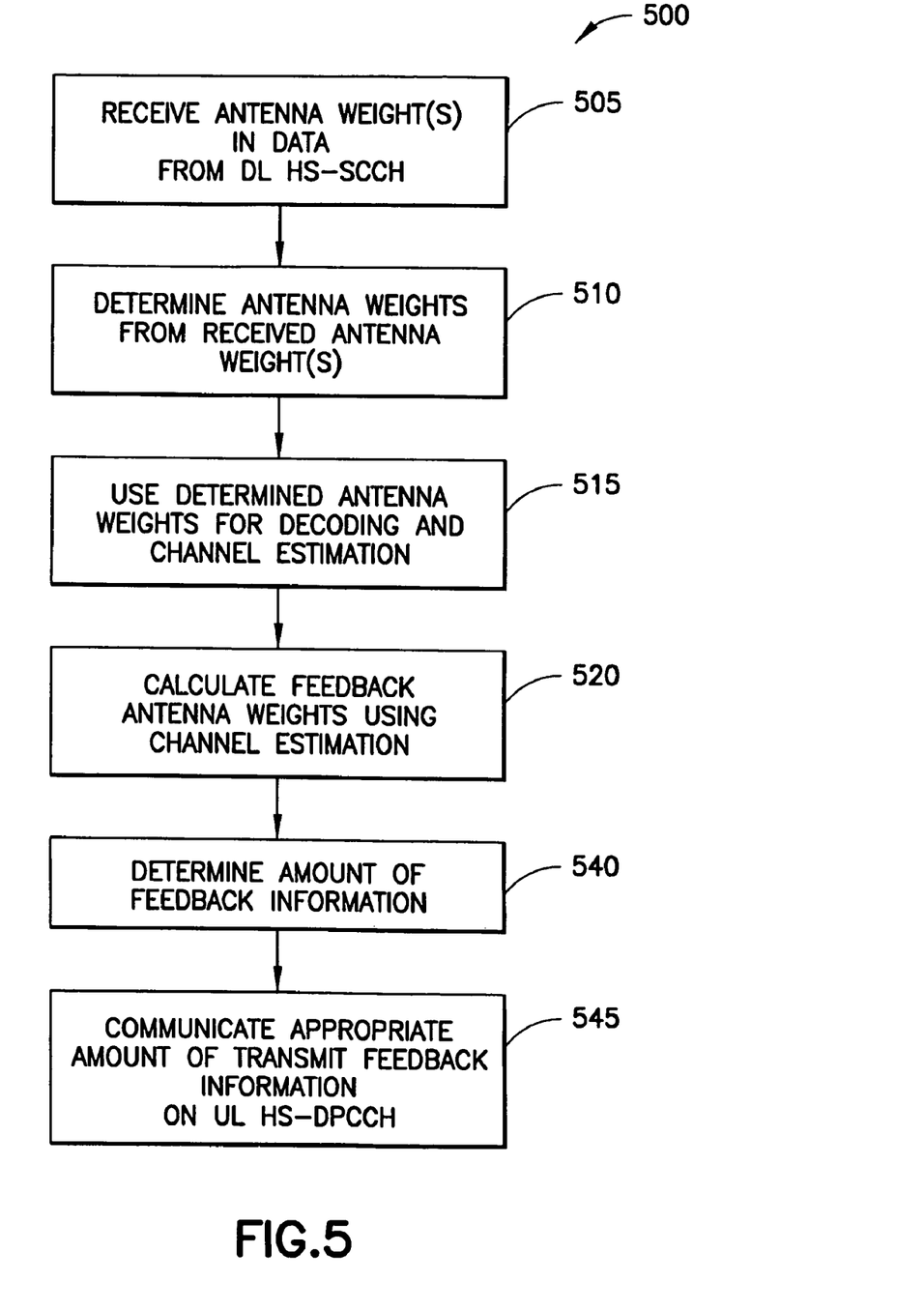
FIG. 5 is a flowchart of an exemplary method performed by a user equipment for providing closed loop transmit antenna operation.

Turning to FIG. 5 with appropriate reference to other figures, a flowchart is shown of an exemplary method 500 performed by a user equipment (UE 10, 210, 310) for providing closed loop transmit antenna operation. Method 500 is performed by a UE under direction, e.g., of the program code 18, 238. Method 500 begins in block 505 when the UE receives information corresponding to antenna weights (e.g., weight information 270, 370) in data from the DL HS SCCH 245. In block 510, antenna weights are determined using the weight information. Block 510 is also performed when less the weight information corresponds to less than all antenna weights. For instance, if weight information corresponding to only antenna weight $W_2$ is received, then antenna weight W1 (and possibly antenna weights $W_3$, $W_4$) can be determined based on information corresponding to the received antenna weight of $W_2$. In the previously cited example, the antenna weight $W_1$ is fixed and the information 270 corresponding to the antenna weight $W_2$ includes two bits, as shown in FIG. 6 as weight information 610-1 through 610-4. The two bits from weight information 610-1 through 610-4 select a phase 620-1 through 620-4 in the range the range $\{0, -\pi/2, \pi/2, \pi\}$ for the weight $W_2$ and the magnitude of the amplitude of $W_2$ is fixed. In block 510, the bits are used to determine what the phase for $W_2$ should be. The antenna weights used by the Node-B 220 (e.g., weights $W_1$, $W_2$ in FIG. 2, information about which is transmitted using the weight information 270) are used by the UE 210 when the UE 210 performs channel estimation (block 515, described below), and the channel estimation allows the UE 210 to estimate new antenna weights (e.g., corresponding to feedback weight information 276) to be signaled back to the Node-B 220. In case of two antennas, only the relative phase and/or amplitude difference between the antenna weights used for the two antennas needs to be estimated. It should be noted that this example assumes both the network node (e.g., Node B 220) and UE (e.g., UE 210) use the same number of bits to communicate antenna weight information. However, this is merely for example and the network node and UE can use different numbers of bits for antenna weight information and can differ in the amount (e.g., bits per unit time) of antenna weight information transmitted.

In block 515, the determined antenna weights are used for decoding and channel estimation. In block 520, feedback antenna weights (e.g., feedback antenna weights 276, 376) are calculated based on the channel estimation. The amount of feedback information (e.g., closed loop antenna transmit feedback information 275, 375) is determined in block 540. The amount of closed loop antenna transmit feedback information 275, 375 can be made dynamic and can correspond, e.g., to the CQI/CSI feedback rate. For instance, in 3GPP Release 5, the CQI reporting is periodic, with a maximum reporting every 2 milliseconds (MS). Each CQI word is five bits. This is described in 3GPP TSs 25.214 and 25.215. The amount of closed loop antenna transmit feedback information 275, 375 can therefore also vary over time. The calculated antenna weights from step 520 are then encoded (e.g., as feedback weight information 276, 376) in block 545 and communicated from the UE to the network node on the UL HS DPCCH 250.

It should be realized that the exemplary embodiments of this invention may be extended as well to the EUTRAN concept where OFDM will likely be used in the DL. This implies that when the Node B 20 sends a so called allocation table to the UE 10, information is also sent to specify which transmit diversity weights (or closed loop MIMO scheme) is being used (for those UEs 10 that are operable with such transmit diversity or MIMO schemes). Similarly, those UEs 10 that support transmit diversity or closed loop MIMO are enabled to send transmit antenna feedback information in conjunction with sending UL Ack/Nack and CSI/CQI to the Node-B 20.

Based on the foregoing description of non-limiting embodiments of this invention it can be appreciated that an aspect of this invention relates to apparatus, methods and a computer program to operate a Node-B with a UE so as to transmit on the DL HS SCCH information descriptive of a transmit antenna scheme used by the Node B, the information comprising Node-B transmit antenna weight information.

Based on the foregoing description of non-limiting embodiments of this invention it can be appreciated that a further aspect of this invention relates to apparatus, methods and a computer program to operate a UE with a Node-B so as to transmit closed loop antenna transmit feedback information on the UL HS DPCCH.

Based on the foregoing description of non-limiting embodiments of this invention it can be appreciated that an aspect of the invention relates to an apparatus comprising: a transceiver configured to be coupled to a plurality of antennas used to transmit data signals; one or more memories comprising program code; and one or more data processors coupled to the one or more memories and to the transceiver. The one or more data processors are configured when the program code is executed to perform the following operations: determining weights corresponding to each of the plurality of antennas based at least in part on recommended antenna weights, each weight suitable to modify a corresponding one of the data signals prior to transmission using a corresponding one of the antennas; each weight capable of being different than the antenna weight recommended by the receiver; and causing the transceiver to transmit information corresponding to at least one applied weight at the transceiver, the information allowing at least the at least one weight as actually applied to be determined. The apparatus further comprises a plurality of multipliers configured to multiply a corresponding one of the data signals by a corresponding weight and to produce a plurality of modified data signals; and the operations further comprise causing the modified data signals to be transmitted by the transceiver using the plurality of antennas, wherein the data signals correspond to at least two different data signals routed to each of the multipliers.

It is noted that the functionality in the network node (e.g., Node B) and the UE can be performed as shown above, i.e., through software instructions that cause a corresponding DP to perform the functions described above. As such the embodiments may comprise a signal bearing medium tangibly embodying a program of machine-readable instructions executable by at least one data processor for carrying out functions described above. Furthermore, in general, the various embodiments may be implemented in hardware such as special purpose circuits, software, logic or any combination thereof. For example, some aspects may be implemented in hardware, while other aspects may be implemented in software (e.g., firmware) which may be executed by a data processor such as a controller, digital signal processor, general purpose microprocessor or other computing device, although the invention is not limited thereto. While various aspects of the invention may be illustrated and described as block diagrams, flow charts, or using some other pictorial representation, it is well understood that these blocks, flowcharts, or other pictorial representation described herein may be implemented in, as non-limiting examples, hardware, software, some combination thereof.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre stored design modules. Once the design for a semiconductor circuit has been completed, the resultant design, in a standardized electronic format (e.g., Opus, GDSII, or the like) may be transmitted to a semiconductor fabrication facility or "fab" for fabrication.

Various modifications and adaptations may become apparent to those skilled in the relevant arts in view of the foregoing description, when read in conjunction with the accompanying drawing. As but some examples, the use of other similar or equivalent messages and/or signaling techniques may be attempted by those skilled in the art, and more that two transmit and/or receive antennas may be employed. However, all such and similar modifications of the teachings of this invention will still fall within the scope of this invention.

Furthermore, some of the features of the examples of this invention may be used to advantage without the corresponding use of other features. As such, the foregoing description should be considered as merely illustrative of the principles, teachings, examples and embodiments of this invention, and not in limitation thereof.

What is claimed is:

1. A method comprising:
   determining weights corresponding to each of a plurality of antennas used to transmit data signals to a receiver based at least in part on recommended antenna weights by the receiver, each weight suitable to modify a corresponding one of the data signals prior to transmission from a transmitter using a corresponding one of the antennas; each weight capable of being different than the antenna weight recommended by the receiver; and
   transmitting information to the receiver corresponding to at least one applied weight at the transmitter, the information allowing at least the at least one weight as actually applied to be determined.

2. The method of claim 1, wherein transmitting further comprises transmitting the information using a High Speed Shared Control Channel.

3. The method of claim 1, further comprising:
   modifying the data signals using corresponding ones of the weights; and
   transmitting the modified data signals using the plurality of antennas.

4. The method of claim 3, wherein modifying and transmitting maintains transmission diversity by modifying a single data signal using corresponding ones of the weights and by transmitting the modified data signals of the single data signal using the plurality of antennas.

5. The method of claim 3, wherein modifying and transmitting uses Multiple In, Multiple Out (MIMO) transmission by modifying at least two data signals using corresponding ones of the weights and by transmitting the modified data signals of the at least two data signals using the plurality of antennas.

6. The method of claim 3, wherein transmitting further comprises transmitting the modified data signals using a High Speed Downlink Shared Channel.

7. The method of claim 1, wherein at least an additional weight other than the at least one weight can be determined using the transmitted information.

8. The method claim 1, wherein the information is first information and wherein the method further comprises receiving second information calculated by the receiver, the second information corresponding to weights to be used for each of the plurality of antennas, and wherein determining weights further comprises determining, using the second information calculated by the receiver, the antenna weights corresponding to each of the plurality of antennas.

9. The method of claim 8, wherein the information calculated by the receiver is received over a High Speed Dedicated Physical Control Channel.

10. The method of claim 8, wherein the information calculated by the receiver is received in amounts that vary over a period of time.

11. An apparatus comprising:
a transceiver configured to be coupled to a plurality of antennas used to transmit data signals;
one or more memories comprising program code; and
one or more data processors coupled to the one or more memories and to the transceiver, the one or more data processors configured when the program code is executed to perform the following operations:
determining weights corresponding to each of the plurality of antennas based at least in part on recommended antenna weights, each weight suitable to modify a corresponding one of the data signals prior to transmission using a corresponding one of the antennas; each weight capable of being different than the antenna weight recommended by the receiver; and
causing the transceiver to transmit information corresponding to at least one applied weight at the transceiver, the information allowing at least the at least one weight as actually applied to be determined.

12. The apparatus of claim 11, wherein transmitting further comprises transmitting the information using a High Speed Shared Control Channel.

13. The apparatus of claim 11, wherein:
the apparatus further comprises a plurality of multipliers configured to multiply a corresponding one of the data signals by a corresponding weight and to produce a plurality of modified data signals; and
the operations further comprise causing the modified data signals to be transmitted by the transceiver using the plurality of antennas.

14. The apparatus of claim 13, wherein each of the data signals correspond to a single data signal routed to each of the multipliers.

15. The apparatus of claim 13, wherein the data signals correspond to at least two different data signals routed to each of the multipliers.

16. The apparatus of claim 11, wherein transmitting further comprises transmitting the modified data signals using a High Speed Downlink Shared Channel.

17. The apparatus of claim 11, wherein at least an additional weight other than the at least one weight can be determined using the transmitted information.

18. The apparatus claim 11, wherein the information is first information, wherein the transceiver receives second information calculated by a receiver, the second information corresponding to weights to be used for each of the plurality of antennas, and wherein determining weights further comprising determining, using the second information calculated by the receiver, the weights corresponding to each of the plurality of antennas.

19. An information bearing medium tangibly embodying a program of machine-readable instructions executable by at least one data processor to perform operations comprising:
determining weights corresponding to each of a plurality of antennas used to transmit data signals based at least in part on recommended antenna weights by a receiver, each weight suitable to modify a corresponding one of the data signals prior to transmission using a corresponding one of the antennas; each weight capable of being different than the antenna weight recommended by the receiver; and
causing information to be transmitted corresponding to at least one applied weight, the information allowing at least the at least one weight as actually applied to be determined.

20. A method comprising:
transmitting feedback information for recommended antenna weights by a receiver;
receiving information corresponding to at least one of a plurality of applied weights used at a transmitter, the plurality of applied weights corresponding to a plurality of first antennas used to transmit first data signals, where each weight was used to modify a corresponding one of the first data signals prior to transmission using a corresponding one of the first antennas;
using the received information, determining the plurality of weights corresponding to the plurality of first antennas; and
using at least the plurality of weights, decoding second data signals received using a plurality of second antennas to create at least one output signal.

21. The method of claim 20, wherein decoding further comprises performing channel estimation using at least the plurality of weights.

22. The method of claim 21, further comprising calculating second weights for each of the plurality of first antennas using the channel estimation.

23. The method of claim 22, further comprising transmitting second information corresponding to the calculated second weights on a High Speed Dedicated Physical Control Channel.

24. The method of claim 20, wherein receiving further comprises receiving the information on a High Speed Shared Control Channel.

25. The method of claim 20, further comprising receiving the second data signals using a High Speed Downlink Shared Channel.

26. The method of claim 20, wherein decoding further comprises decoding the second data signals received using the plurality of second antennas to create a single output signal, wherein each of the first data signals was determined using a single input signal, and wherein the single output signal comprise a decoded version of the single input signal.

27. The method of claim 20, wherein decoding further comprises decoding the second data signals received using the plurality of second antennas to create a plurality of output signals, wherein the first data signals were determined using a plurality of input signals, and wherein the plurality of output signal comprise decoded versions of the plurality of input signals.

28. An apparatus comprising:
a transceiver configured to be coupled to a plurality of first antennas used to receive first data signals, the transceiver configured to transmit feedback information for recommended antenna weights, the transceiver configured to receive information corresponding to at least one of a plurality of applied weights at a transmitter, the plurality of weights corresponding to a plurality of second antennas used to transmit second data signals, where each weight was used to modify a corresponding one of the second data signals prior to transmission using a corresponding one of the second antennas;

one or more memories comprising program code; and one or more data processors coupled to the one or more memories and to the transceiver, the one or more data processors configured when the program code is executed to perform the following operations:

using the received information, determining the plurality of weights corresponding to the plurality of second antennas; and using at least the plurality of weights, decoding the first data signals to create at least one output signal.

29. The apparatus of claim 28, wherein the operation of decoding further comprises the operation of performing channel estimation using at least the plurality of weights.

30. The apparatus of claim 29, wherein the operations further comprise calculating second weights for each of the plurality of second antennas using the channel estimation.

31. The apparatus of claim 30, further comprising the operation of causing second information corresponding to the calculated second weights to be transmitted using the transceiver on a High Speed Dedicated Physical Control Channel.

32. The apparatus of claim 31, wherein the operation of causing second information corresponding to the calculated second weights to be transmitted further comprises causing the second information corresponding to the calculated second weights to be transmitted based on an amount of information allowed to be transmitted during a time period.

33. The apparatus of claim 28, wherein the transceiver is further configured to receive the information on a High Speed Shared Control Channel.

34. The apparatus of claim 28, wherein the transceiver is further configured to receive the first data signals using a High Speed Downlink Shared Channel.

35. The apparatus of claim 28, wherein operation of decoding further comprises the operation of decoding the second data signals received using the plurality of first antennas to create a single output signal, wherein each of the second data signals was determined using a single input signal, and wherein the single output signal comprise a decoded version of the single input signal.

36. The apparatus of claim 28, wherein the operation of decoding further comprises the operation of decoding the second data signals received using the plurality of first antennas to create a plurality of output signals, wherein the second data signals were determined using a plurality of input signals, and wherein the plurality of output signal comprise decoded versions of the plurality of input signals.

37. An information bearing medium tangibly embodying a program of machine-readable instructions executable by at least one data processor to perform operations comprising:

transmitting feedback information for recommended antenna weights by a receiver;

causing information to be received, the information corresponding to at least one of a plurality of applied weights used at a transmitter, the plurality of weights corresponding to a plurality of first antennas used to transmit first data signals, where each weight was used to modify a corresponding one of the first data signals prior to transmission using a corresponding one of the first antennas; and using the received information, determining the plurality of weights corresponding to the plurality of first antennas; and using at least the plurality of weights, decoding second data signals received using a plurality of second antennas to create at least one output signal.

* * * * *